US012163837B2

(12) United States Patent
Schlueter et al.

(10) Patent No.: US 12,163,837 B2
(45) Date of Patent: Dec. 10, 2024

(54) PEAK DETERMINATION IN TWO-DIMENSIONAL OPTICAL SPECTRA

(71) Applicant: Thermo Fisher Scientific (Bremen) GmbH, Bremen (DE)

(72) Inventors: Hans-Juergen Schlueter, Bremen (DE); Antonella Guzzonato, Bremen (DE); Norbert Quaas, Bremen (DE); Peter Huelstede, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 369 days.

(21) Appl. No.: 17/629,332

(22) PCT Filed: Jul. 30, 2020

(86) PCT No.: PCT/EP2020/071463
§ 371 (c)(1),
(2) Date: Jan. 21, 2022

(87) PCT Pub. No.: WO2021/018992
PCT Pub. Date: Feb. 4, 2021

(65) Prior Publication Data
US 2022/0252454 A1    Aug. 11, 2022

(30) Foreign Application Priority Data

Jul. 31, 2019    (GB) ..................... 1910920

(51) Int. Cl.
*G01J 3/28*    (2006.01)
*G01J 3/18*    (2006.01)

(52) U.S. Cl.
CPC ........... *G01J 3/2803* (2013.01); *G01J 3/1809* (2013.01); *G01J 2003/2813* (2013.01); *G01J 2003/2859* (2013.01)

(58) Field of Classification Search
None
See application file for complete search history.

(56) References Cited

U.S. PATENT DOCUMENTS 5,303,265 A    4/1994  McLean
6,029,115 A    2/2000  Tracy et al.
(Continued)

FOREIGN PATENT DOCUMENTS

CN    106404173 A        2/2017
EP      0692703 A1 *    7/1995
(Continued)

OTHER PUBLICATIONS

Nobach et al. "Two-dimensional Gaussian Regression for Sub-pixel Displacement Estimation in Particle Image Velocimetry or Particle Position Estimation in Particle Tracking Velocimetry," Experiments in Fluids, No. 38, Year 2005, pp. 511-515.
(Continued)

*Primary Examiner* — Giovanni Astacio-Oquendo
*Assistant Examiner* — Carl F. R. Tchatchouang
(74) *Attorney, Agent, or Firm* — Klarquist Sparkman, LLP

(57) ABSTRACT

A method of determining a peak intensity in an optical spectrum is described. The method includes producing a two-dimensional array of spectrum values by imaging the optical spectrum onto a detector array. An offset using an actual location and an expected location of a peak of an interpolated subarray is used to adjust an expected location of another peak that is within another two-dimensional subarray. Interpolated spectrum values are then used to produce a peak intensity value of the second peak.

23 Claims, 5 Drawing Sheets

(56) References Cited

U.S. PATENT DOCUMENTS

| | | | |
|---|---|---|---|
| 7,319,519 B2 | 1/2008 | Florek et al. | |
| 9,625,470 B2* | 4/2017 | Coon | H01J 49/0031 |
| 9,677,934 B2 | 6/2017 | Hartwell et al. | |
| 10,094,712 B2 | 10/2018 | Neitsch et al. | |
| 2004/0114139 A1* | 6/2004 | Florek | G01J 3/02 |
| | | | 356/328 |
| 2004/0218184 A1* | 11/2004 | Jorgenson | G01N 15/147 |
| | | | 356/419 |
| 2014/0211199 A1* | 7/2014 | Kuo | G01J 3/2803 |
| | | | 356/73 |
| 2016/0290862 A1 | 10/2016 | Ikku | |
| 2018/0128679 A1* | 5/2018 | Neitsch | G01J 3/0286 |
| 2018/0340827 A1* | 11/2018 | Yamada | C12Q 1/689 |

FOREIGN PATENT DOCUMENTS

| | | |
|---|---|---|
| EP | 0800066 A2 | 10/1997 |
| WO | 2012100284 A1 | 8/2012 |

OTHER PUBLICATIONS

Combined Search and Examination Report dated Jan. 21, 2020, mailed for GB Patent Application No. 1910920.6.
International Search Report and Written Opinion dated Nov. 13, 2020, to PCT Application No. PCT/ EP2020/071463.

* cited by examiner

PEAK DETERMINATION IN TWO-DIMENSIONAL OPTICAL SPECTRA

CROSS-REFERENCE TO RELATED APPLICATIONS

This application is a National Stage application filed under 35 USC § 371 of International Patent Application No. PCT/EP2020/071463, filed on Jul. 30, 2020. PCT Application No. PCT/EP2019/071463, claims priority to GB 1910920.6, filed Jul. 31, 2019, both of which are incorporated by reference herein in their entirety.

FIELD OF THE INVENTION

The present invention relates to peak determination in two-dimensional optical spectra. More in particular, the present invention relates to a method of determining a peak intensity in an optical spectrum, such as an echelle spectrum.

BACKGROUND OF THE INVENTION

Optical spectrometry is a well-known technology used to determine the properties of light emitted by sources or reflected by objects, and hence to determine the properties of those sources or objects. A particular example of optical spectrometry is echelle spectrometry, where two diffraction gratings, or a grating and a prism, are used that are rotated 90° relative to each other. When using such a configuration, a continuous wavelength spectrum can be split up into two substantially perpendicular directions, producing a two-dimensional spectrum which is projected onto a detector. Typically, a semiconductor detector is used, such as a CMOS (complementary metal oxide semiconductor) detector chip. An echelle spectrum typically has lines, so-called orders, and peaks, most peaks being on an order. The peaks are local maxima of the spectrum and are typical for a certain atom or molecule. The location of a peak in an echelle spectrum represents the particular element or molecule causing the peak while the amplitude of the peak indicates the relative quantity of the element or molecule.

A problem that may occur when using optical spectroscopy, in particular echelle spectroscopy, is that the peaks may wander due to drift. That is, due to temperature variations the angles or relative distances of the gratings (or of the grating and the prism) may alter, causing the location of the peaks of the echelle spectrum to change. As a result, peaks may not be identified, or may identified incorrectly, mistaking the peak related to one element for the peak related to another element.

Optical spectrometry may be used in conjunction with ICP (inductively coupled plasma) sources to provide the light to be analyzed. Although ICP sources can advantageously be used for this purpose, they have the disadvantage that they produce a large amount of heat. This heat increases the temperature of the parts of the optical spectrometer and can cause drift, and thus an offset, in an optical spectrometer. This typically leads to incorrect results, as the intensity of the optical spectrum may be determined in the wrong location, for example next to a peak instead of at a peak.

It is therefore desired to accurately measure any offset in order to be able to correct for it. When measuring the offset in an optical spectrum, however, the pixel size of the detector constitutes a problem: any offset in the optical spectrum is measured in steps which are at least equal to the pixel size. This necessarily limits the accuracy of the offset determination, and hence of any drift correction. It has been found that measuring offset in pixel size steps is insufficiently accurate for some applications.

U.S. Pat. No. 6,029,115 discloses a spectrometric instrument with a detector for acquiring spectral data in selected one-dimensional subarrays. Offset data are determined to obtain the spectral shift for subarray positions at different points in time. Slit scanning may be used to achieve sub-increments smaller than the pixel size of the detector. However, slit scanning requires a very accurate stepper motor, which is expensive and which itself may introduce drift due to temperature variations.

U.S. Pat. No. 7,319,519 discloses a method for wavelength calibration in echelle spectra. To determine drift of the spectral lines, a reference light source is used. The drift is then corrected mechanically, by adjusting manipulating elements at the grating, prims, mirror and detector. However, correcting drift mechanically is cumbersome and may be slow as it involves several parts which may themselves cause drift.

SUMMARY OF THE INVENTION

The present invention seeks to overcome the disadvantages of the prior art and to provide a method of determining a peak intensity in an optical spectrum which is both accurate and reliable, even in the presence of drift, and which allows to avoid the use of slit scanning, a stepper motor and mechanical adjustment. The present invention also seeks to provide a method of detecting drift in optical spectroscopy, and a system for optical spectrometry.

Accordingly, the present invention provides a method of determining a peak intensity in an optical spectrum, the method comprising:
  producing a two-dimensional array of spectrum values by imaging the optical spectrum onto a detector array,
  selecting a first two-dimensional subarray of the array of spectrum values such that the subarray includes a first peak of the spectrum, the first peak having an expected location,
  interpolating, within the first subarray, the spectrum values to produce a first interpolated subarray,
  determining, by using the first interpolated subarray, an actual location of the first peak,
  determining an offset by using the actual location and the expected location of the first peak,
  adjusting an expected location of a second peak of the spectrum by using the offset,
  selecting a second two-dimensional subarray of the array of spectrum values such that the second subarray includes the second peak, the second peak having an adjusted expected location, and
  using, within the second subarray, interpolated spectrum values to produce a peak intensity value of the second peak.

By using a first subarray, the actual location of a first or reference peak is determined. By using the expected location and the actual location of the first or reference peak, the offset of the spectrum can be determined. The offset is then used to position a second subarray more accurately by adjusting the expected location, and thus determine the intensity of the second or target peak more accurately.

The present invention is based on the insight that the offset of an optical spectrum due to drift is substantially uniform. That is, the offset of the second or target peak is substantially equal to the offset of the first or reference peak. This allows the determined offset of the reference peak to be used as an estimate of the offset of the target peak.

By selecting a subarray and interpolating the spectrum values to produce an interpolated subarray, the actual location of a peak can be determined with greater accuracy than without interpolation. In particular, interpolation allows determining the location of a peak with sub-pixel accuracy. In addition, interpolation allows determining the peak intensity with greater accuracy, especially when the peak is only a few pixels wide. Any rounding errors can be reduced by using sub-pixel interpolation, while the effect of drift on rounding errors is significantly reduced.

It is noted that interpolation as used in the invention is interpolation in space, as opposed to interpolation in time. Although interpolation in time may also be used in methods and apparatus according to the invention, for example to determine any offset at intervening points in time, the interpolation of spectrum values as described here is interpolation in space.

The present invention offers the additional advantage of removing the need for sophisticated temperature control systems which attempt to avoid drift by keeping the parts of the optical path at a constant temperature. By taking the offset caused by drift into account, the occurrence of any drift is significantly less critical to the proper determination of peak intensities in optical spectra. The invention can use a single light source, for example a plasma, thus removing the need for a reference light source. The invention removes the need for slit scanning and allows the use of a stationary slit, which is mechanically simpler and significantly less prone to introduce artifacts.

The detector array is preferably a two-dimensional detector array. This allows a two-dimensional array of spectrum values to be produced almost instantly. However, embodiments can be envisaged in which a one-dimensional detector array is used, and in which the physical optical spectrum is scanned using the one-dimensional detector array.

Producing a first interpolated subarray may comprise interpolating the spectrum values in a first direction and a second direction, the first direction and the second direction preferably being orthogonal. That is, when interpolating the first subarray which is used to determine the location (and possibly the intensity) of the first or reference peak, interpolation may be carried out in two orthogonal dimensions, typically an x-dimension and a y-dimension. One such dimension, for example the x-dimension, may substantially correspond with the direction in which the orders extend. That is, the x-dimension and the approximate longitudinal direction of the orders may define between them a small angle, for example an angle of less than 30°, preferably less than 15°. Although it is possible to interpolate a subarray in two non-orthogonal dimensions, for example in two dimensions (directions) enclosing an angle of approximately 45°, such interpolations are generally computationally more demanding.

As mentioned above, producing a first interpolated subarray may comprise interpolating the spectrum values in a first direction and a second direction. That is, the first interpolated subarray is produced by interpolating in two directions. In some embodiments interpolation in one direction only may be sufficient, thus saving some computational effort. However, interpolation in two directions provides a greater accuracy with respect to both the location and the intensity of a peak.

It is noted that using, within the second subarray, interpolated spectrum values to produce a peak intensity value of the second peak preferably involves interpolating the spectrum values in one direction only, as will be explained in more detail below.

The interpolation can be carried out producing an almost arbitrary number of intermediate (that is, interpolated) spectrum values between two original spectrum values. In some embodiments, only a single intermediate value may be used, thus reducing the computational effort at the expense of a smaller increase in accuracy. In typical embodiments, a greater number of intermediate values is produced, for example between 5 and 20 intermediate values, such as 10 intermediate values, although numbers greater than 20 may also be used.

It is noted that the number of intermediate values need not be identical in both directions. As mentioned above, interpolation may be carried out in one direction only, thus producing zero intermediate points in the other direction. However, preferred embodiments comprise interpolating in both directions, however, the number of intermediate values produced in one direction may, for example, be 10 while the number of intermediate values produced in the other direction may be, for example, only 25. Similarly, the number of intermediate values produced when interpolating the second subarray need not be the same as the number of intermediate values produced when interpolating the first subarray.

Determining an actual location of the first peak may comprise determining a maximum of the first interpolated subarray and determining the location of the maximum.

Determining a maximum may involve determining the largest spectrum value, determining a cluster of largest spectrum values, or deriving a maximum from inflection points of a peak, for example. Determining a maximum can be carried out in both directions. Determining the location of the maximum can involve determining coordinates, such as x- and y-coordinates, of a maximum.

Using, within the second subarray, interpolated spectrum values to produce a peak intensity value of the second peak may comprise:
  interpolating, within the second subarray, the spectrum values in the second direction only to produce a second interpolated subarray,
  determining, within the second interpolated subarray, for each original spectrum value in the first direction, a sum of interpolated spectrum values to produce a string of sum values,
  interpolating the string of sum values to produce an interpolated string of sum values, and
  determining a sum of the interpolated string of sum values to produce a peak intensity value of the second peak.

In such embodiments, the spectrum values are interpolated in one direction only. This direction is here referred to as second direction, which may for example be the y-direction. It has been found that when the orders of an echelle spectrum approximately coincide with the x-direction, then it is advantageous to interpolate the spectrum, when determining the peak intensity, in the y-direction only. This preference is based upon the shape of the peaks and the orders in general and will of course depend on the orientation of the detector array relative to the optical spectrum.

Interpolating in the second direction results in a greater accuracy, not only when determining the peak position but also when determining the peak intensity. Similarly, interpolating the string of sum values in the first direction also results in a greater accuracy. Embodiments can be envisaged in which interpolating the sum values is omitted.

It is noted that producing a peak intensity value of the second peak as described above involves adding (interpolated and/or original) spectrum values over at least part of a subarray, resulting in a sum of peak values. This may be regarded as the equivalent of integrating the spectrum values of the peak in two directions. The resulting sum, which represents the peak intensity, may be divided by the number of spectrum values involved in the calculation, thus resulting in an average peak value. It will be clear that both the summed spectrum values and the average peak value will generally differ from the maximum peak value.

The method may further comprise determining an actual location of the second peak. That is, in addition to the intensity (that is, a measure of the amplitude of the spectrum values) the location of the peak may be determined. The location of a peak may be determined by establishing the coordinates of the maximum of the peak. Accordingly, determining an actual location of the second peak may comprise determining a maximum of the second interpolated subarray and determining the location of the maximum.

As mentioned above, producing a peak intensity value of the second or target peak may comprise interpolating the spectrum values in one direction only, the interpolation in the other direction being carried out on sum values (or average values). However, in order to determine a maximum, it is preferred to interpolate the spectrum values in two directions. The method of the invention may therefore further comprise interpolating, within the second subarray, the spectrum values in the first direction too to produce an augmented second interpolated subarray, wherein determining a maximum comprises determining a maximum of the augmented second interpolated subarray. As used here, the term second interpolated subarray refers to a second subarray which has been interpolated in a single direction only, while the term augmented second subarray refers to a second subarray which has been interpolated in two directions.

Several types of interpolation may be used, such as a Gaussian interpolation. The same interpolation technique may be used for both directions. However, it can be advantageous to use a different technique for each direction.

The interpolation in the first direction may comprise a cubic spline interpolation, preferably a cubic Hermite interpolation, or a Gaussian interpolation. The interpolation in the second direction may also comprise a cubic spline interpolation, but in the second direction an Akima spline interpolation is preferred. In some embodiments, a bicubic spline interpolation may be used.

Determining a maximum may be carried out in different ways and may depend on the direction in which the maximum is determined. In an embodiment, determining a maximum can comprise, for each spectrum value of a subarray in the second direction, determining, in the first direction, a largest interpolated value. That is, in such an embodiment a maximum is identified by searching for the highest interpolated or original spectrum value in the first direction, for each spectrum value in the second direction.

Alternatively, or additionally, determining a maximum may comprise, for each spectrum value of a subarray in the first direction, determining, in the second direction, two inflection points of an interpolated subarray. In such an embodiment, inflection points are used as indicators of the presence of a peak. Depending on the shape of a peak and the direction in the array, inflection points may be a better indicator of a maximum, and in particular of the position of a maximum. In some embodiments, the indication of the presence of a maximum may be enhanced by squaring the spectrum values and the determining the inflection points of the (preferably interpolated) peak.

Alternatively, or additionally, a Gaussian fit may be used to determine the peak position. A set of, for example, the 3, 4 or 5 highest spectrum values may be used for a Gaussian fit as described in, for example, Nobach and Honkanen, Experiments in Fluids (2005) 38: 511-515.

Selecting a two-dimensional subarray of the array of spectrum values such that the subarray includes a peak of the spectrum, the peak having an expected location, may comprise selecting a subarray such that it has a center which substantially coincides with the expected location of the peak. That is, a subarray may be located in such a way that it is centered around a peak, more in particular, around the expected location of a peak.

The dimensions or extent of a subarray, more in particular its length and width measured in pixels and/or millimeters, may be fixed or may vary depending on the (expected) peaks. In some embodiments, all subarrays may have the same dimensions. In other embodiments, different subarrays may have different dimensions.

In typical embodiments, a subarray is substantially smaller than the detector array. When measured in pixels, a subarray may have less than 10% of the number of pixels of the detector array, preferably less than 1%, more preferably less than 0.1%. In some embodiments, a subarray may measure only 5×20 pixels (that is, original pixels, not counting interpolated pixels), while the detector array may have 1000×1000 pixels or more.

The dimensions of a subarray may be adapted to a specific peak. The peak may have an expected extent, and the method may further comprise selecting the subarray such that it has an extent which covers a largest part of the expected extent of the peak, wherein the largest part is preferably at least 50%, more preferably at least 70%. The extent may be defined by a certain minimum intensity (that is, spectrum value).

The optical spectrum may comprise an echelle spectrum, which may be obtained using a diffraction grating in a known manner. However, other optical spectra, in particular two-dimensional optical spectra, may also be used.

If the method of the invention is used with an echelle spectrum, the first direction may substantially correspond with a direction of orders of the echelle spectrum. That is, the first dimension and the approximate longitudinal direction of the orders may define between them a small angle, for example an angle of less than 30°, preferably less than 15°. The second direction may then be perpendicular to the first direction and substantially perpendicular to the approximate longitudinal direction of the orders of the echelle spectrum. In such embodiments, the first direction may be referred to as x-direction and the second direction as y-direction.

As mentioned above, the method utilizes an expected location of the first peak and of the second and any further peaks. These expected locations may be previously determined and stored. Accordingly, the expected location of the first peak and/or the expected location of the second peak may be retrieved from a memory unit.

The optical spectrum may be produced using a plasma, while the first peak and/or the second peak may correspond with substances present in the plasma.

The present invention also provides a method of determining offset in optical spectroscopy, the method comprising:

detecting a two-dimensional optical spectrum by using a detector array, defining a two-dimensional subarray of the detector array, which subarray includes an expected location of a peak of the spectrum, interpolating, within the subarray, the spectrum to produce an interpolated partial two-dimensional spectrum, determining, by using the interpolated partial spectrum, the actual location of the peak, and determining an offset by using the actual location and the expected location of the peak.

The method of determining offset may further comprise:

defining a further two-dimensional subarray which includes the expected location of a further peak of the spectrum, and adjusting the location of the at least one further subarray by using the offset.

The present invention additionally provides a software program product comprising instructions for causing a processor to carry out the method according to any of the preceding claims. The software program product may be non-tangible. The processor may have an associated memory for storing the instructions.

The present invention further provides a system for optical spectrometry, the system comprising a detector array and a processor with an associated memory, wherein the processor is configured to carry out the method described above. The system may further comprise a plasma source for producing light and at least one echelle grating for producing an optical spectrum. The plasma source may be an inductively coupled plasma (ICP) source.

DETAILED DESCRIPTION OF THE DRAWINGS

The present invention is based on the insight that the offset of an optical spectrum due to drift is substantially uniform. That is, the offset of the second or target peak is substantially equal to the offset of the first or reference peak. This allows the determined offset of the reference peak to be used as an estimate of the offset of the target peak.

The present invention is further based on the insight that a small amount of drift of an optical spectrum may have relatively large effects on the measured intensity of spectrum peaks, even when the amount of drift is less than the distance between the centers of two pixels of the detector array. The present invention benefits from the insight that when using a subarray to determine a peak intensity, the proper positioning of the subarray is important to obtain accurate results. The present invention is also based upon the insight that interpolation of a detected optical spectrum can significantly improve the accuracy of determining both the peak location and the peak intensity, especially but not exclusively for peaks having a width of only a few pixels.

Figure 1:
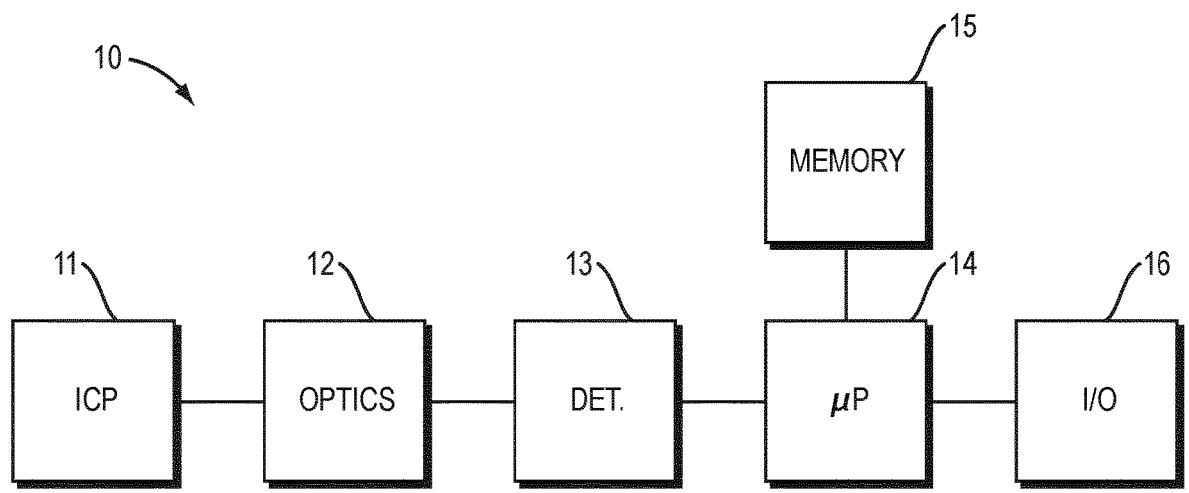
FIG. 1 schematically shows a system for optical spectrometry in accordance with the invention.

The optical spectroscopy system 10 schematically illustrated in FIG. 1 is shown to comprise a light source 11, an optical arrangement 12, a detector array 13, a processor 14, a memory 15 and an input/output (I/O) unit 16. The light source 11 may be a plasma source, such as an inductively coupled plasma (ICP) source. The optical arrangement 12 may comprise an echelle grating and a prism (and/or a further grating) to produce an echelle spectrum of the light produced by the light source 11. An image of the two-dimensional echelle spectrum is formed on the detector array 13. Such an image will later be discussed in more detail with reference to FIG. 2. The detector array 13 may be a CCD (charge coupled device) array, for example. A typical detector array will have at least approximately 1024×1024 pixels (1 megapixel). A rectangular detector array may but need not be square. The detector array 13 is arranged for producing spectrum values corresponding with the detected amount of light of the echelle spectrum, and for transferring the spectrum values to the processor 14. The processor 14 may be constituted by a commercially available microprocessor (□P), such as an Intel® i5® or one of its successors. The memory 15 can be a suitable semiconductor memory and may be used to store instructions allowing the processor 14 to carry out an embodiment of a method according to the invention.

Figure 2:
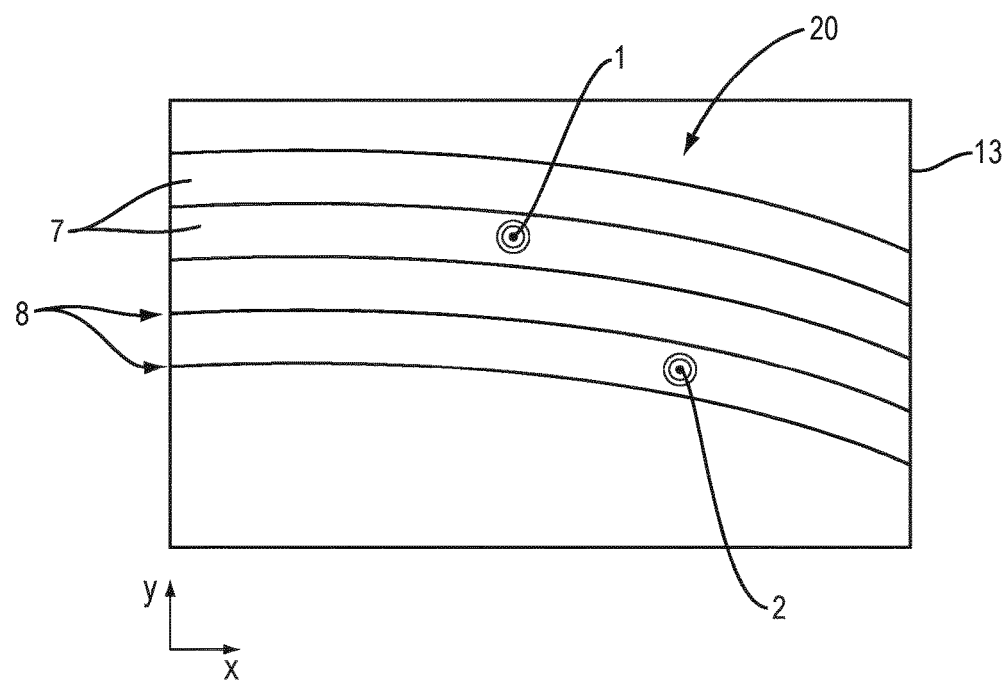
FIG. 2 schematically shows a detector array on which an image of an echelle spectrum has been formed.

A detector array 13 on which an echelle spectrum has been imaged is schematically shown in FIG. 2. The echelle spectrum 20 is shown to comprise so-called orders 7 which extend approximately horizontally in FIG. 2. That is, the orders 7 extend approximately in a first direction of the detector array 13, which first direction may be referred to as x-direction in the example of FIG. 2. Accordingly, the orders 7 extend approximately perpendicularly to a second direction of the detector array 13, which second direction may be referred to as y-direction. The orders in an echelle spectrum are typically slightly curved, so that the degree to which orders are parallel or perpendicular to the first and the second direction may vary over the echelle spectrum.

In the example shown, the first direction (x-direction) is parallel to the longer sides of the rectangular detector array 13, while the second direction (y-direction) is parallel to the shorter sides. It will be understood that the orientation of the detector array is chosen so as to best fit the two-dimensional spectrum and that the terms first direction and second direction can, in principle, be interchanged. The detector array 13 comprises an array of detector elements or pixels which produce output signals representing detected spectrum values.

The orders 7 are areas of higher light intensity and consequently higher spectrum values. The orders 7 are separated by valleys or troughs 8 of lower light intensity and hence lower spectrum values. An echelle spectrum typically has one or more peaks which are characteristic of certain substances. For instance, when using inductively coupled plasma (ICP) to produce an echelle spectrum there is typically a peak representing $CO_2$. In FIG. 2, a first peak 1 and a second peak 2 are schematically represented. In actual echelle spectra, more than two peaks will typically be present. Each peak is located in an order and constitutes a maximum of that order, at least locally. It can be seen that each peak extends in both the first direction (the x-direction in FIG. 2) and the second direction (the y-direction in FIG. 2). It is noted that in typical embodiments, peaks may have a length and a width of only a few pixels, for instance 3 to 5 pixels.

Different substances will produce peaks in different locations of the optical spectrum. In principle, those locations are fixed for each substance, so that a substance can be identified on the basis of the location of its peak in the spectrum. However, in practice those locations are subject to drift caused by temperature differences. It will be understood that parts will expand or contract when their temperatures varies, if only slightly. In echelle optics, such relatively small changes in the geometry may cause clearly measurable changes in the location of the peaks. Thus, both the location and the intensity of a peak may be measured incorrectly due to temperature-related drift. This problem is aggravated by the fact that the dimensions of the peaks are typically small relative to the pixel size. As mentioned above, a peak may extend over only 4 pixels, for example. So, if the actual peak drifts over a distance of half a pixel, the measured location of the peak may move over an entire pixel. In addition, the small size of the peaks relative to the pixels easily gives rise to errors when determining the peak intensity, as will be shown with reference to FIG. 3.

Figure 3A:
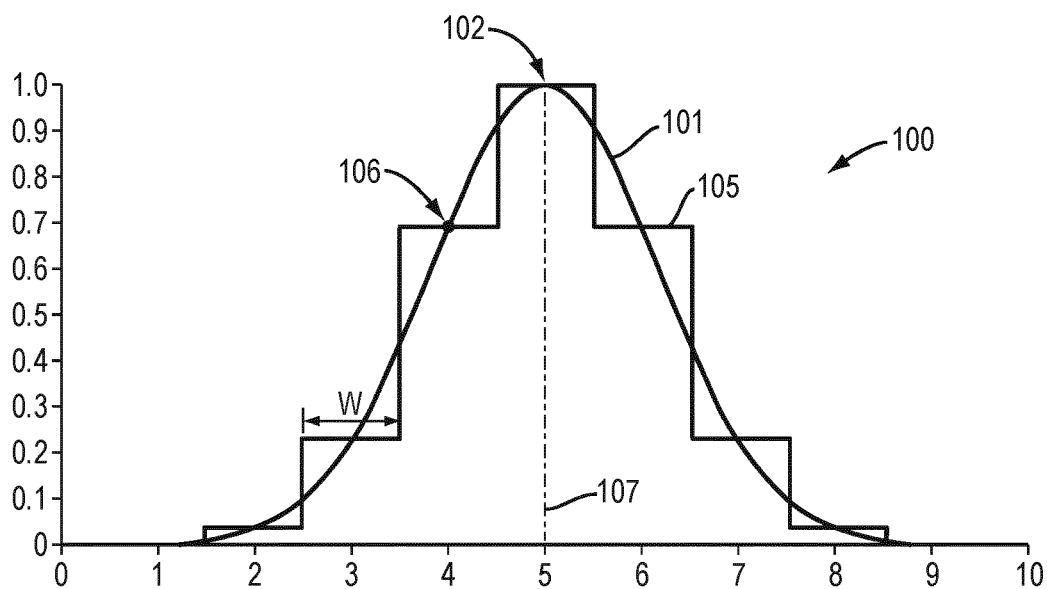
FIGS. 3A-3C schematically show peaks of an optical spectrum as detected with a detector array according to the prior art.
Figure 3B:
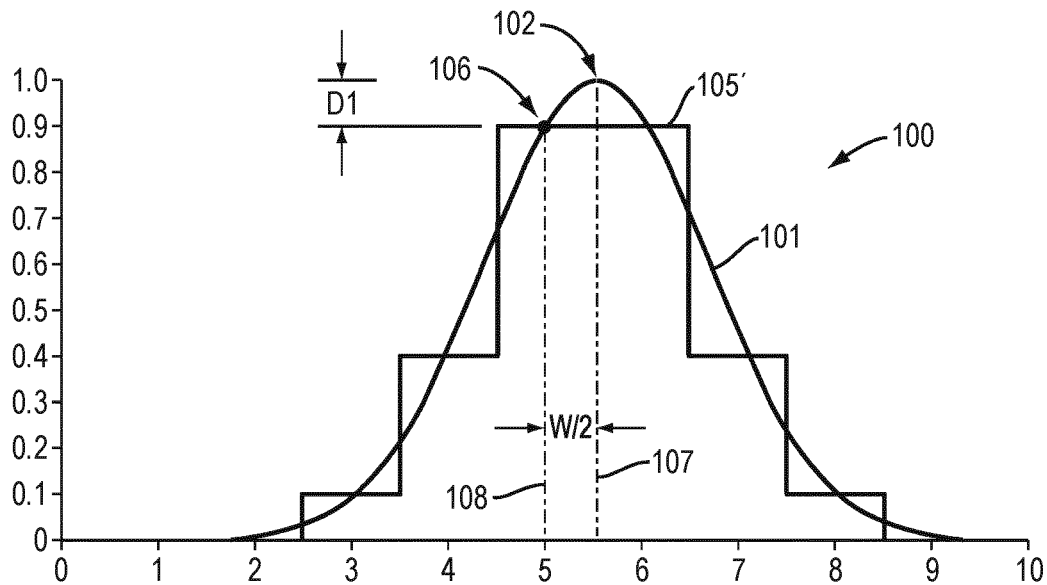
Figure 3C:
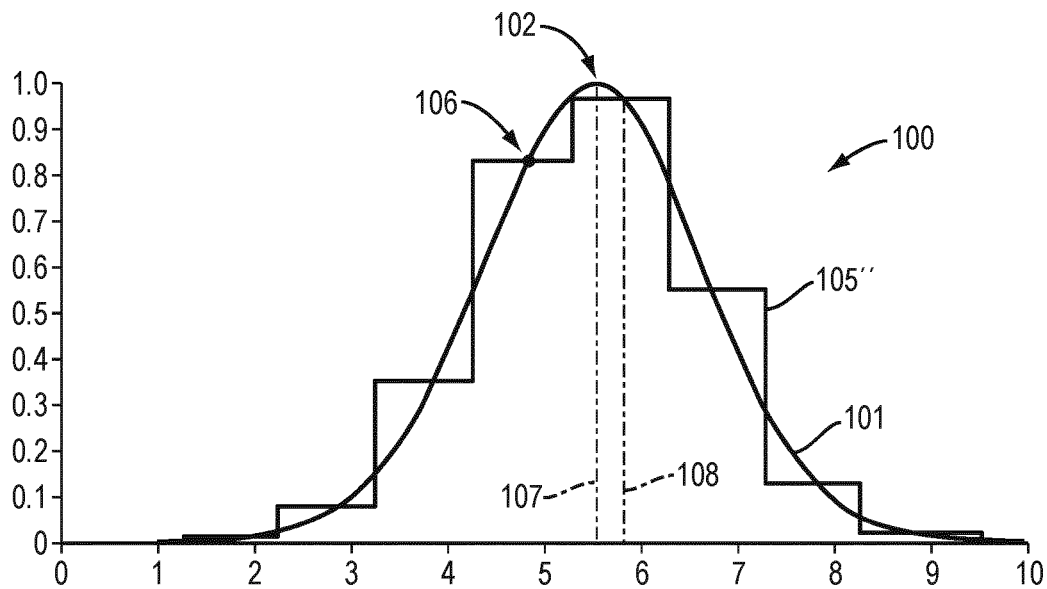

The detection of a peak of an optical spectrum is schematically illustrated in FIG. 3A-3C, where the peak intensity is shown as a function of the distance in a single direction of the detector array. The peak 100 may be identical to the peak 1 or the peak 2 in FIG. 2. The spectrum peak 100 schematically illustrated in FIG. 3A is shown, by way of example, to have a Gaussian or bell-curve shape 101 with a maximum 102. This peak 100 is detected by a detector array (13 in FIGS. 1 & 2). This detector array comprises pixels having a pixel width W. This means that a pixel produces a single value which represents the spectrum value at this pixel. Typically, a pixel produces a value which represents the spectrum value at the center 106 of the pixel. This means that the smooth Gaussian shape 101 will be represented by a stepped shape 105, each step representing the output of a respective pixel. This is not a problem if the pixels of the detector array are aligned with the peak as illustrated in the example of FIG. 3A, where the center line 107 of the Gaussian shape 101 runs through the center of a single pixel. In this particular case, the top of the stepped shape 105 corresponds exactly with the maximum 102 while the stepped shape 105 of the digitized peak is symmetrical about the center axis 107 of the Gaussian peak shape 101. It is noted that the peak width may be defined as the width of the peak at an intensity (that is, amplitude) equal to approximately 0.7 (that is, $1/\sqrt{2}$) times the maximum intensity.

In the example of FIG. 3B, the detector array is shifted relative to the peak 100 so that the maximum 102 no longer coincides with the center of a pixel. Instead, the maximum 102 is located exactly between two adjacent pixels. As a result, the stepped shape 105' of the pixel output is still symmetrical and centered about the peak's center line 107, but its height no longer corresponds with the actual height of the peak as the two center pixels detect the peak intensity at a distance of half a pixel width (that is, at a distance equal to W/2) away from the maximum 102. As shown in FIG. 3B, the center line 108 of the pixels is spaced apart from the center line 107 of the peak shape by a distance W/2. Although the location of the peak will be determined correctly in the example of FIG. 3B, the intensity of the peak (that is, the height of the maximum 102) will be determined incorrectly.

In the example of FIG. 3C, the detector array is shifted relative to the peak 100 so that an asymmetrical stepped shape 105" results. The center line 108 of the pixel closest to the maximum 102 does not coincide with the center line 107 of the Gaussian peak shape 101. The center line 108 of the pixel closest to the maximum 102 is spaced apart from the center line 107 of the peak shape by a distance less than W/2, resulting in both an asymmetrical pixel output curve (that is, stepped shape) 105" and in an incorrect peak intensity value.

It can thus be seen that the small dimensions of the peaks relative to the pixels will lead to errors, both in determining the peak intensity and in determining the peak location. Only in very specific cases, as illustrated in FIG. 3A, can both the peak intensity and the peak location be determined correctly, in all other cases errors will be introduced.

According to a first aspect of the invention, interpolation is used to reduce errors and to improve the accuracy with which both the intensity and the location of a peak can be determined. By using interpolation, additional spectrum values are produced which may be inserted between the original spectrum values to produce an interpolated array of spectrum values, thus producing an array consisting of original values and interpolated values. This is schematically illustrated in FIG. 4.

Figure 4:
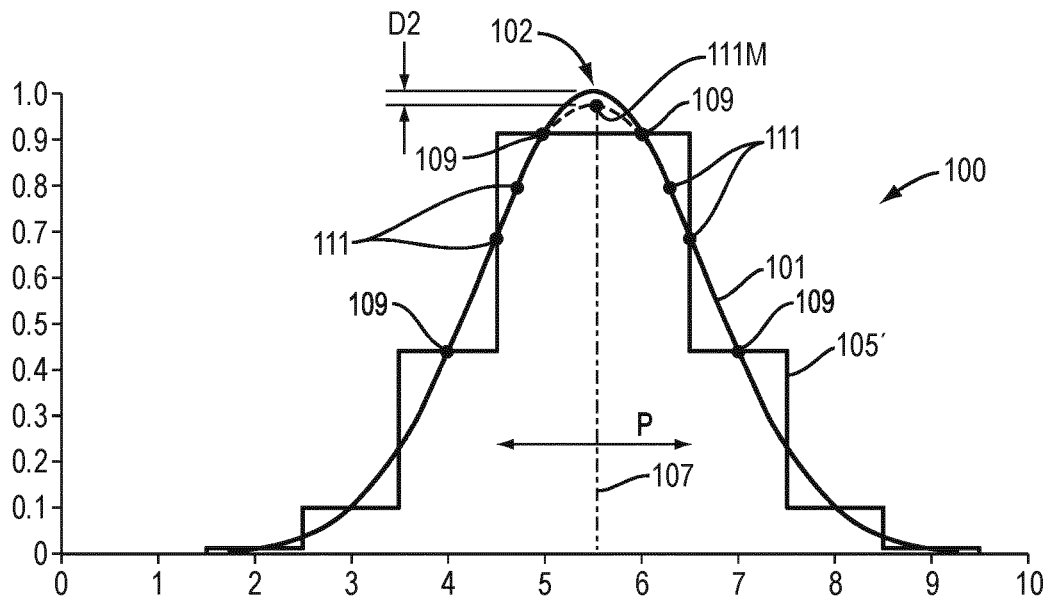
FIG. 4 schematically shows a peak which is interpolated in accordance with the invention.

The example of FIG. 4 is similar to the example of FIG. 3B in that the maximum 102 is located at the border of two adjacent pixels, resulting in a symmetric detected pulse (that is, stepped shape) 105. In FIG. 4, the spectrum values which have been produced by the detector array are shown as spectrum values 109. These spectrum values 109 are the values corresponding with the center (106 in FIG. 3C) of the pixels. According to the invention, the detected spectrum values 109 are used to produce interpolated spectrum values 111. As can be seen in FIG. 4, the difference D2 between the actual maximum at 102 and the interpolated maximum 111M is significantly smaller than the difference D1 between the actual maximum 102 and the detected spectrum values in FIG. 3B. Thus, the error in the measured peak intensity is significantly reduced by interpolation.

Various types of interpolation can be used, such as Gaussian interpolation, cubic spline interpolation and/or Akima spline interpolation. Different types of interpolation may be used in different directions. The number of interpolated spectrum values that is produced to be inserted between two original values may vary depending on the application. In some applications, only a single interpolated spectrum value may be inserted, in other applications 25 or more interpolated spectrum values (that is, intermediate values) may be inserted. The peak may be interpolated over substantially its entire extent, such as the full width at a tenth of the maximum but is preferably interpolated over a limited range which includes the maximum. This peak range P may be equal to the full width at half maximum but is preferably equal to the full width at approximately 0.7 times the maximum, so at approximately $1/\sqrt{2}$ times the full width. In FIG. 4 this peak width P accidentally coincides with the width of two pixels, but it will be understood that each peak may have a different peak width.

According to a further aspect of the invention, interpolation is not carried out on all spectrum values produced by the detector array but only on subsets of those values. More in particular, interpolation is only carried out on subarrays of spectrum values containing certain peaks of the spectrum. This allows the peaks to be determined more accurately while limiting the required computational effort.

In the example of FIG. 4, the peak 100 is an isolated peak. In practice, this is not always the case as peaks may overlap.

The method of the invention additionally allows effective interference reduction where the target or sample peak is interfered with by another peak in the spectrum, the other peak typically being caused by another element. This interference reduction is possible by associating a characteristic and accurate location with the peak of interest, thereby distinguishing the peak of interest from the interfering peak. The characteristic location can be obtained through wavelength calibration, while the accuracy of the location can be significantly enhanced by drift compensation as described above. That is, two overlapping peaks can be identified on the basis of their respective locations in the spectrum.

According to an aspect of the invention, the intensity and/or location of a peak are determined by positioning a subarray while using positioning information derived from the location and/or intensity of a reference peak. More in particular, the location of a reference peak is used to determine any offset, which offset can then be used to adjust the position of a subarray used for determining the intensity and/or location of a target peak.

Figure 5:
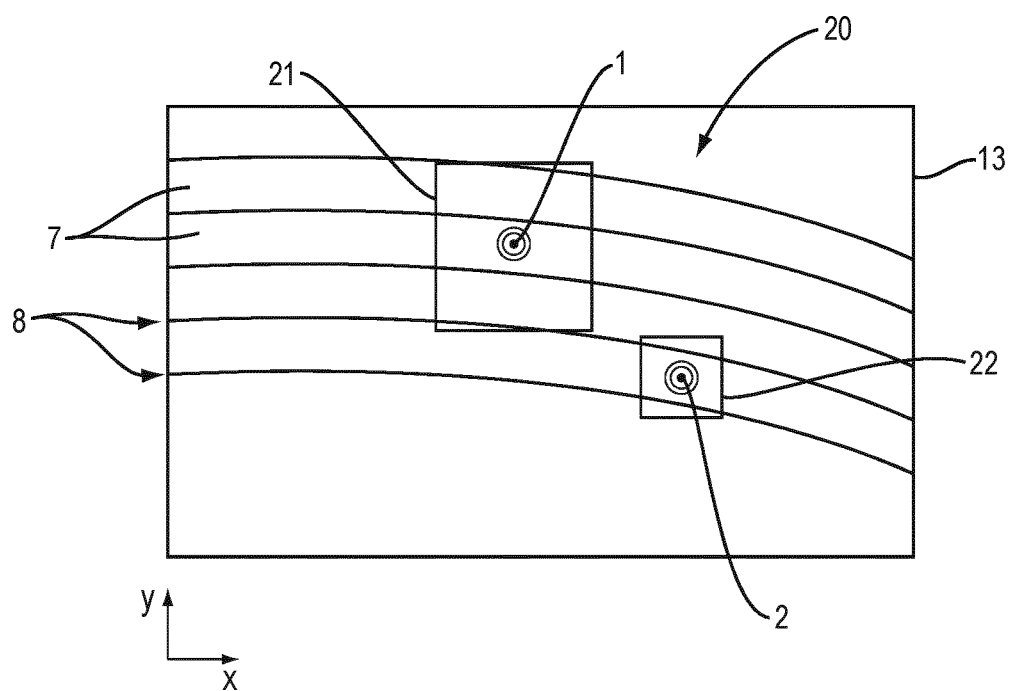
FIG. 5 schematically shows a detector array with subarrays in accordance with the invention.

Determining offset using a subarray and utilizing the offset to adjust the position of a further subarray will now be explained with reference to FIG. 5. As in FIG. 2, a detector array 13 on which an optical spectrum is imaged is schematically shown in FIG. 5. The optical spectrum 20 is shown to comprise orders 7 separated by troughs or minima 8. An order is shown to have a first peak 1 while another order is shown to have a second peak 2. In the present example, the first peak 1 is a reference peak while the second peak 2 is a target peak. That is, the first peak 1 may correspond with a first substance that is known to be present in a plasma, for example, while the second peak 2 may correspond with a second substance, the presence of which in the plasma is to be detected. The first peak may be related to carbon, nitrogen, argon or another plasma component. Thus, a peak related to a substance known to be present in the optical spectrum is used as a reference peak and used to determine any offset due to drift so as to better determine a target peak.

In order to determine the intensity and/or location of a peak, a subarray may be used. In the example of FIG. 5, a first subarray 21 is positioned so as to contain the first peak 1, while a second subarray 22 is positioned so as to contain the second peak 2. Subarrays provide the advantages of reducing the amount of processing (as only a limited number of pixel values has to be processed) and excluding any influence of other peaks. To this end, both the position and the dimensions of a subarray should be chosen so as to include the maximum and at least most of the extent of the peak in question while excluding other peaks as far as possible.

Both the first substance and the second substance have known peak locations in the spectrum. However, the actual locations of these peaks may differ from the expected locations due to drift. As parts of an optical arrangement producing the spectrum may expand or shrink slightly when the temperature changes, the location of the entire spectrum may drift relative to the detector array. Although the drift may be small, even a small drift can cause differences in the measured peak location and peak intensity, as illustrated in the prior art examples of FIGS. 3A-3C.

When using subarrays, drift will cause a peak to move relative to its subarray, such that the subarray is no longer centered around the peak, as is typically desired. By drifting away from the center of the subarray, the detected intensity and/or location of the peak may vary as part of the extent of the peak may move out of the subarray. In some cases, drift may cause the maximum of the peak to be located outside the subarray, which will clearly result in detecting an incorrect peak intensity and/or peak location. The invention solves this problem by determining any drift using the first subarray and compensating the drift when positioning the second subarray. In addition, determining the intensity and/or location of a peak is made more accurate by using interpolation.

According to the invention, therefore, a method may comprise selecting a first two-dimensional subarray 21 of the array of spectrum values such that the first subarray 21 includes a first peak 1 of the optical spectrum. The first peak 1 has an expected location which may be previously stored in a memory. The first subarray 21 is chosen in such a way that it includes the maximum of the first peak, preferably that it is centered around the first peak, leaving sufficient pixels on all sides so that the maximum will still fall within the subarray if an amount of drift occurs. Within the first subarray 1, the spectrum values are interpolated to produce a first interpolated subarray which is used to determine an actual location of the first peak. Then an offset is determined by using the actual location and the expected location of the first peak, the offset representing the drift that has occurred. Using the offset, the expected location of the second peak 2 is adjusted. Subsequently, a second subarray 22 is selected such that the second subarray 22 includes the second peak 2 at the adjusted expected location. Alternatively, the second subarray 22 could be selected on the basis of the expected location of the second peak 2 and then the position of the second subarray 22 could be adjusted using the offset. Finally, interpolated spectrum values of the second subarray 22 are used to produce a peak intensity value of the second peak 2.

As mentioned above, the first subarray 21 may be larger than the second subarray 22, as the drift has not been determined when the first subarray is selected. Conversely, the invention allows the second subarray 22 to be smaller than the first subarray 21 by taking any drift into account.

Figure 6:
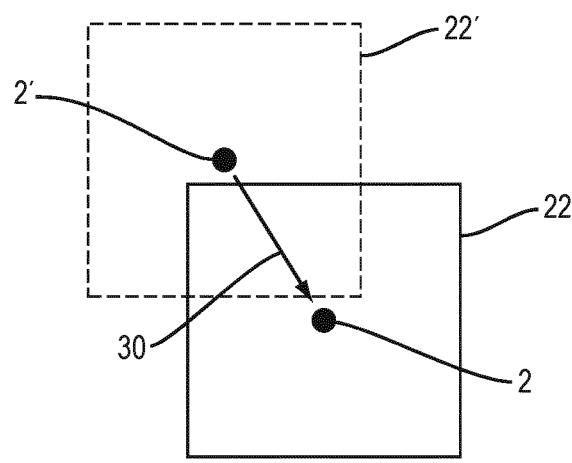
FIG. 6 schematically shows the adjustment of a subarray in accordance with the invention.

The compensation of drift in accordance with an aspect of the invention is schematically illustrated in FIG. 6, where an initial (second) subarray 22' is centered around the expected position of a (second) peak 2'. Drift causes an offset 30 over which the expected position 2' is shifted to reach the actual position 2. By determining this offset 30 and applying it to the (second) subarray 22', the subarray 22' is also shifted and results in the subarray 22 which is centered around the actual position 2. As a result, the peak 2 will be contained in the subarray 22 and the intensity and/or location of the peak 2 can be determined accurately. It will be understood that the subarray 22 need not be centered around the actual position, although such centering is preferred in certain embodiments. By using interpolation, the method according to the invention can obtain sub-pixel accuracy in drift compensation.

As mentioned above, the offset of the first or reference peak (1 in FIG. 5) can be used as an estimate of the offset of the second or target peak 2. In some embodiments, the offset used to adjust the location of the second subarray (the second offset) is identical to the offset of the first peak (the first offset). In other embodiments, the offset applied to the second subarray (second offset) is derived from but is not identical to the offset of the first peak (first offset). In such embodiments, the second offset may be derived from the first offset by applying a correction factor.

Such a correction factor may depend on the distance between the first peak and the second peak (for example, between their expected locations). The correction factor may be determined using an additional reference peak at or near an edge of the array, of which additional reference peak the offset is also determined. The difference between this additional offset and the offset of the original reference peak (first offset) may then be multiplied by the distance of the target peak from the original reference peak and divided by the distance of the additional target peak from the original reference peak to produce a correction factor for correcting the second offset. It will be clear that when the difference between this additional offset and the offset of the original reference peak (first offset) is zero, the correction factor is also zero.

In embodiments of the method according to the invention, determining a peak intensity of a target peak is preferably carried out immediately after determining the offset (of the reference peak). That is, determining the offset and determining a peak intensity value are preferably carried out substantially simultaneously. By leaving substantially no time interval between determining the offset and determining the target peak intensity, it is ensured that drift cannot have any influence on the peak intensity determination.

For each target peak, the offset of the reference peak may be determined again. In some embodiments, however, the determined offset may be used in a plurality of peak determinations, thus re-using the offset for determining the intensity of the same or different peaks. The offset may be re-used for two or more target peaks if no intermediate drift is expected.

Figure 7:
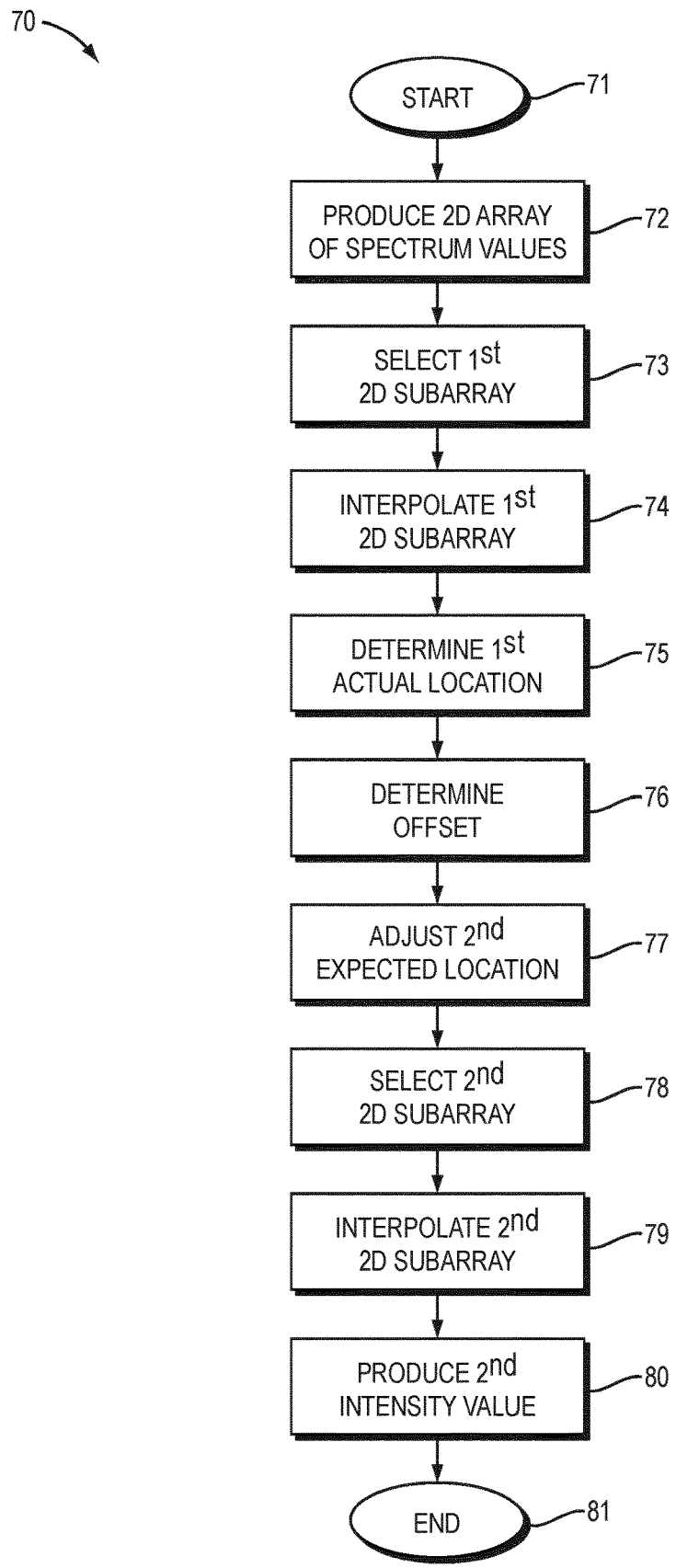
FIG. 7 schematically shows an exemplary embodiment of a method in accordance with the invention.

An exemplary embodiment of a method according to the invention is schematically illustrated in FIG. 7. The method 70 of FIG. 7 starts at 70, after which an array of spectrum values is produced at 72. A first subarray is selected at 73 and interpolated at 74. Using the first, interpolated subarray, the actual location of the first or reference peak is determined. Using the actual location and the expected location, the offset of the first or reference peak is determined at 76. Using the offset, the expected location of the second or target peak is adjusted at 77. Then a second subarray is selected at 78, which is at least partially interpolated at 79. That is, the second subarray may be interpolated in one direction only at 79, although in some embodiments it may be interpolated in two directions. Using the at least partially interpolated second subarray, a second peak intensity value is produced at 80. The method ends at 81.

It is noted that the maximum or height of a peak may be distinguished from the intensity of a peak. The maximum may refer to the highest spectrum value or values within the peak, while the intensity may refer to the sum (or integral) of the spectrum values of the peak (or part of the peak).

Producing a peak intensity is preferably, but not necessarily, carried out by using interpolation. It is possible to use the interpolated spectrum to calculate the intensity of a peak, using the interpolated spectrum values in both the first and the second direction, and adding up these spectrum values (including any original values) to arrive at the intensity. However, according to a further aspect of the invention a more efficient procedure is used, in which the interpolated spectrum is used for adding up in one direction only, and in which the resulting sums are then interpolated and added up to produce the intensity value.

Accordingly, using interpolated spectrum values of a subarray to produce a peak intensity value of a peak may comprise interpolating a set of spectrum values of the subarray in one direction only to produce an interpolated subarray. If an interpolated array has already been produced by using interpolation in two directions, then the interpolated values of one direction can be used and another interpolation can be omitted. In either case, a subarray which has been interpolated in at least one direction is obtained. Then, for each original spectrum value of the interpolated subarray in the first direction, a sum (or average) of interpolated spectrum values is determined to produce a string of sum (or average) values and subsequently the string of sum (or average) values is interpolated to produce an interpolated string of sum (or average) values. That is, in the second direction the sum values (or average values) are interpolated instead of the spectrum values. The peak intensity value is produced by determining a sum of the interpolated string of sum (or average) values.

This procedure is particularly useful to produce the peak intensity of the second peak by using the second subarray but may additionally, or alternatively, be used to produce the peak intensity of the first peak by using the first subarray.

Aspects of the invention have been described with reference to determining properties of a target peak. However, some aspects may be used independently from determining properties of a target peak. For example, aspects of the invention may be used to determine offset in optical spectra, for example using a reference peak only, without using a target peak. Accordingly, a method of determining offset in optical spectroscopy may comprise detecting a two-dimensional optical spectrum by using a detector array and defining a two-dimensional subarray of the detector array, which subarray includes an expected location of a peak of the spectrum. At least part of the spectrum values of the subarray may be interpolated to produce an interpolated partial two-dimensional spectrum. Then, using the interpolated partial spectrum, the actual location of the peak may be determined, and an offset may subsequently be determined by using the actual location and the expected location of the peak.

A software program product according to the invention may comprise instructions allowing a processor to carry out a method according to the invention. The software program product may be intangible, such as a software program product which may be downloaded from the internet, but may alternatively involve a physical carrier, such as a USB stick or a DVD.

An optical spectrometer system according to the invention may comprise a detector array coupled to a processor with an associated memory. The memory may store instructions allowing the processor to carry out a method according to the invention. The system may further comprise a light source, such as a plasma source. An inductively coupled plasma (ICP) source may be particularly suitable. The system may further comprise an optical arrangement for producing a two-dimensional optical spectrum. Such an optical arrangement may comprise at least one echelle grating for producing an echelle spectrum. The optical arrangement may further comprise a further grating and/or a prism. The system may further comprise an input/output (I/O) unit, which may include a display screen and a keyboard.

It will be understood by those skilled in the art that the invention is not limited to the embodiments described above and that many modifications and additions are possible without departing from the scope of the invention as defined in the appending claims.

The invention claimed is:

1. A method of determining a peak intensity in an optical spectrum, the method comprising:
    producing a two-dimensional array of spectrum values by imaging the optical spectrum onto a detector array,
    selecting a first two-dimensional subarray of the array of spectrum values such that the subarray includes a first peak of the spectrum, the first peak having an expected location,
    interpolating the spectrum values of the first two-dimensional subarray in two dimensions to produce a first interpolated subarray,
    determining, by using the first interpolated subarray, an actual location of the first peak, determining an offset by using the actual location and the expected location of the first peak, adjusting an expected location of a second peak of the spectrum by using the offset, selecting a second two-dimensional subarray of the array of spectrum values such that the second subarray includes the second peak, the second peak having an adjusted expected location, and using, within the second subarray, interpolated spectrum values to produce a peak intensity value of the second peak.

2. The method according to claim 1, wherein the detector array is a two-dimensional detector array.

3. The method according to claim 1, wherein the first direction and the second direction are orthogonal.

4. The method according to claim 3, wherein determining an actual location of the first peak comprises:
determining a maximum of the first interpolated subarray, and
determining the location of the maximum.

5. The method according to claim 1, wherein using, within the second subarray, interpolated spectrum values to produce a peak intensity value of the second peak comprises:
interpolating, within the second subarray, the spectrum values in the second direction only to produce a second interpolated subarray,
determining, within the second interpolated subarray, for each original spectrum value in the first direction, a sum of second interpolated spectrum values to produce a string of sum values,
interpolating the string of sum values to produce an interpolated string of sum values, and determining a sum of the interpolated string of sum values to produce a peak intensity value of the second peak.

6. The method according to claim 5, further comprising determining an actual location of the second peak.

7. The method according to claim 6, wherein determining the actual location of the second peak comprises:
determining a maximum of the second interpolated subarray, and
determining the location of the maximum.

8. The method according to claim 7, further comprising:
interpolating, within the second subarray, the spectrum values in the first direction to produce an augmented second interpolated subarray,
wherein determining a maximum comprises determining a maximum of the augmented second interpolated subarray.

9. The method according to claim 3, wherein the interpolation in the first direction comprises a cubic spline interpolation or a Gaussian interpolation.

10. The method according to claim 5 wherein the interpolation in the second direction comprises an Akima spline interpolation.

11. The method according to claim 5, wherein determining a maximum comprises, for each spectrum value of a subarray in the second direction:
determining, in the first direction, a largest interpolated value.

12. The method according to claim 11, wherein determining a maximum comprises, for each spectrum value of a subarray in the first direction:
determining, in the second direction, two inflection points of an interpolated subarray.

13. The method according to claim 1, wherein selecting a two-dimensional subarray of the array of spectrum values such that the subarray includes a peak of the spectrum, the peak having an expected location, comprises:
selecting a subarray such that it has a center which substantially coincides with the expected location of the peak.

14. The method according to claim 13, wherein the peak has an expected extent, further comprising:
selecting the subarray such that it has an extent which covers a largest part of the expected extent of the peak, wherein the largest part is at least 50%.

15. The method according to claim 1, wherein the optical spectrum comprises an echelle spectrum.

16. The method according to claim 15, wherein the first direction substantially corresponds with a direction of orders of the echelle spectrum.

17. The method according to claim 1, wherein the expected location of the first peak and/or the expected location of the second peak is retrieved from a memory unit.

18. The method according to claim 1, wherein the optical spectrum is produced using a plasma, and wherein the first peak and/or the second peak correspond with substances present in the plasma.

19. A method of determining offset in optical spectroscopy, the method comprising:
detecting a two-dimensional optical spectrum by using a detector array,
defining a two-dimensional subarray of the detector array, which subarray includes an expected location of a peak of the spectrum,
interpolating the spectrum of the two-dimensional subarray in two dimensions to produce an interpolated partial two-dimensional spectrum,
determining, by using the interpolated partial two-dimensional spectrum, the actual location of the peak, and
determining an offset by using the actual location and the expected location of the peak.

20. The method according to claim 19, further comprising:
defining a further two-dimensional subarray which includes the expected location of a further peak of the spectrum, and
adjusting the location of the at least one further subarray by using the offset.

21. A computer program product including one or more non-transitory computer-readable media having computer programs instructed stored therein, the computer program instructions being configured such that, when executed by one or more computing devices, the computer program instructions cause the one or more computing devices to:
produce a two-dimensional array of spectrum values by imaging the optical spectrum onto a detector array;
select a first two-dimensional subarray of the array of spectrum values such that the subarray includes a first peak of the spectrum, the first peak having an expected location;
interpolate the spectrum values of the first two-dimensional subarray in two dimensions to produce a first interpolated subarray;
determine, by using the first interpolated subarray, an actual location of the first peak;
determine an offset by using the actual location and the expected location of the first peak;
adjust an expected location of a second peak of the spectrum by using the offset;

select a second two-dimensional subarray of the array of spectrum values such that the second subarray includes the second peak, the second peak having an adjusted expected location; and use, within the second subarray, interpolated spectrum values to produce a peak intensity value of the second peak.

22. A system for optical spectrometry, the system comprising:

a detector array; and a processor with an associated memory, wherein the processor is configured to execute instructions in the associated memory to:

produce a two-dimensional array of spectrum values by imaging the optical spectrum onto a detector array;

select a first two-dimensional subarray of the array of spectrum values such that the subarray includes a first peak of the spectrum, the first peak having an expected location;

interpolate the spectrum values of the first two-dimensional subarray in two dimensions to produce a first interpolated subarray;

determine, by using the first interpolated subarray, an actual location of the first peak;

determine an offset by using the actual location and the expected location of the first peak;

adjust an expected location of a second peak of the spectrum by using the offset;

select a second two-dimensional subarray of the array of spectrum values such that the second subarray includes the second peak, the second peak having an adjusted expected location; and use, within the second subarray, interpolated spectrum values to produce a peak intensity value of the second peak.

23. The system according to claim 22, further comprising a plasma source for producing light and an echelle grating for producing an optical spectrum.

\* \* \* \* \*